United States Patent [19]

Sandwith et al.

[11] Patent Number: 4,881,482
[45] Date of Patent: Nov. 21, 1989

[54] FLOATING STORAGE FACILITY FOR FLUID-LIKE MATERIALS

[76] Inventors: Stanley R. Sandwith, 4883 Coleman Place, Delta, B. C., Canada; Daniel Wittenberg, 3459 River Road West, Ladner, B. C., Canada

[21] Appl. No.: 200,448

[22] Filed: May 31, 1988

[30] Foreign Application Priority Data

Oct. 30, 1987 [CA] Canada .................................. 550714

[51] Int. Cl.⁴ ............................................. B63B 35/44
[52] U.S. Cl. .................................. 114/256; 114/74 A; 137/236.1
[58] Field of Search ..................... 137/236.1; 114/256, 114/74 A, 74 T

[56] References Cited

U.S. PATENT DOCUMENTS

| | | | |
|---|---|---|---|
| 2,402,790 | 6/1946 | Vorenkamp | 114/256 |
| 2,487,786 | 11/1949 | Bogle | 114/74 T |
| 3,230,967 | 1/1966 | Castro | 137/236.1 |
| 4,141,377 | 2/1979 | Fernandez et al. | 137/236.1 |
| 4,231,873 | 11/1980 | Swigger | 114/256 |
| 4,335,977 | 6/1982 | Ihli | 114/256 |
| 4,688,505 | 8/1987 | Yang | 114/256 |

FOREIGN PATENT DOCUMENTS

| | | | |
|---|---|---|---|
| 949816 | 6/1974 | Canada . | |
| 969486 | 6/1975 | Canada . | |
| 430004 | 11/1974 | U.S.S.R. | 114/256 |
| 1237142 | 6/1971 | United Kingdom | 137/236.1 |

Primary Examiner—Sherman D. Basinger
Assistant Examiner—Thomas J. Braham
Attorney, Agent, or Firm—Baker, Maxham, Jester & Meador

[57] ABSTRACT

This invention is directed to a novel floating storage facility for fluid-like materials which can be used to store products in a water related environment. The floating storage facility module includes a waterproof pressure compensating diaphragm which is suitable for retaining a fluid-like product within the diaphragm, and (b) a flotation collar associated with the diaphragm to enable the diaphragm to be immersed in a designated manner in the body of water.

11 Claims, 6 Drawing Sheets

FLOATING STORAGE FACILITY FOR FLUID-LIKE MATERIALS

FIELD OF THE INVENTION

This invention is directed to a novel floating storage facility for fluid-like materials which can be used to store products in a water related environment. In particular, this invention pertains to a floating storage or storage and containment facility for fluidlike materials which can be utilized to store in a surrounding body of water fluid-like food for use by fish farms.

BACKGROUND OF THE INVENTION

In recent years, particularly on the west coast of Canada and the United States, it has become common practice to raise salt water fish, and notably salmon, in enclosures installed in suitable salt water coastal environments, commonly called fish or salmon farms. Such farms are of substantial size and rear thousands of salmon per year. A common problem associated with raising such large numbers of salmon is to conveniently store and handle the large quantities of food that the fish eat each day. For example, a typical salmon farm operation may require several tons of fish feed per day to satisfy the appetites of the rapidly growing fish. Handling fish food in bulk, typically pelletized or liquid fish feed, requires not only suitable, convenient and inexpensive ways to store such large quantities of such fish food but mechanisms must be devised so that the food can be readily and cheaply supplied to the fish. One method of dealing with these problems is to locate large floating fish feed sheds, scows, barges or silos adjacent the fish farm. These vessels are extremely expensive, tilt when being unloaded, and must be designed to minimize operational problems in rough waters.

The technology involved in fish farming, and principally salmon farms, is currently in a strong stage of development. It has been determined, for instance, that high quality feed and proper nutrition are extremely important to maintaining fish health and minimizing mortality rates. Proper fish nutrition improves the fish's resistance to disease and other problems which contribute to high mortality rates. It is thus an important factor to be able to store and readily supply to the fish large quantities of bulk high quality fish feed.

Recently, a liquid fish food emulsion which is stored on site in bulk containers and which, at fish feeding time, is blended on site in a hopper with a dry fish food admixture to form a soft pellet like material, has been used successfully as a fish farm food. The material is pumped directly to the fish pens. This type of fish food has been shown to increase salmon growing rates up to two fold over a twenty month rearing period compared to previous conventional fish feeding systems.

SUMMARY OF THE INVENTION

The invention is directed to a floating storage facility module comprising: (a) waterproof pressure compensating diaphragm means which is suitable for retaining a fluid-like product placed within the diaphragm means, and (b) flotation means associated with the diaphragm means to enable the diaphragm means to be immersed in a designated manner in a body of water.

The diaphragm means can be contained in a containment means. The diaphragm means can be secured to the containment means, or the flotation means if no containment means is present. In the facility, a cover can be placed over the top of the containment and/or diaphragm means. Also, maximum liquid level control means may be provided above the diaphragm in both the containment means and the diaphragm means.

In the storage or storage/containment facility, a restraining device such as a weight or restraining line can be used to limit or reduce the movement of the diaphragm. In one version, the diaphragm means can be held at the bottom of the containment means by a weight. The weight together with the diaphragm can be raised relative to the containment means by a hoisting means, such as a hand or winch drawn rope. In the containment means, the flotation means can encircle the containment means. The containment means may be tapered so that two or more containment means can be fitted generally inside one another in a nesting manner. The containment means has associated therewith water pressure compensating means such as one or more ports or openings which permits water to enter or leave the bottom of the space between the containment means and the diaphragm means when product stored in the diaphragm means is evacuated or filled. Two or more containment facility modules can be secured together in a rigid, semi-rigid or flexible manner.

DRAWINGS

In the drawings, which illustrate specific embodiments of the floating storage and storage/containment facility, but which should not be construed as limiting the spirit or scope of the invention in any way.

DETAILED DESCRIPTION OF A SPECIFIC EMBODIMENT OF THE INVENTION

For commercialization purposes, the floating storage and/or storage/containment facility disclosed herein has been identified with the trade mark "SEA-LO". The SEA-LO is a floating storage and/or storage/containment facility for fluid-like materials such as fresh water, sewage, liquid fish food silage, by-products from fish processing operations, and the like.

The floating storage and/or storage/containment facility of the invention, made up of modules, enables the suspension of stored fluids within the surrounding water medium thus greatly reducing structural and flotation requirements of conventional floating fluid storage and containment facilities such as scows, barges, tanker vessels, or silos mounted on such vessels. In this disclosure, the word "containment" is intended to mean controlling or defining the space within which the diaphragm is permitted to move, and also the concept of holding material that might escape from a damaged, faulty or ruptured diaphragm.

Basically, the invention is one or more storage silo(s) (storage diaphragm or storage diaphragm/containment sleeve) suspended in water by respective flotation collars secured together in a fixed, gimbled, or other suitable manner. In the preferred embodiment, within the containment sleeve, there is a water impermeable storage diaphragm liner which is secured around the top, in an air tight or semi-air tight manner, to the inner surface of the containment sleeve at some point slightly above or below the water line. In the containment/diaphragm embodiment, free passage of water to and from the inside of the lower region or the containment sleeve between the sleeve and the diaphragm must be provided so as to enable the storage diaphragm to collapse or expand freely within the confines of the containment sleeve, as storage product is being removed or supplied to the interior of the diaphragm. This allows maintenance of pressure equilibriums between the interior and exterior of the containment sleeve at all times. The silo portion is equipped with a self-draining cover, which is vented as required and is form fitted to the top of the outer containment sleeve.

Figure 1:
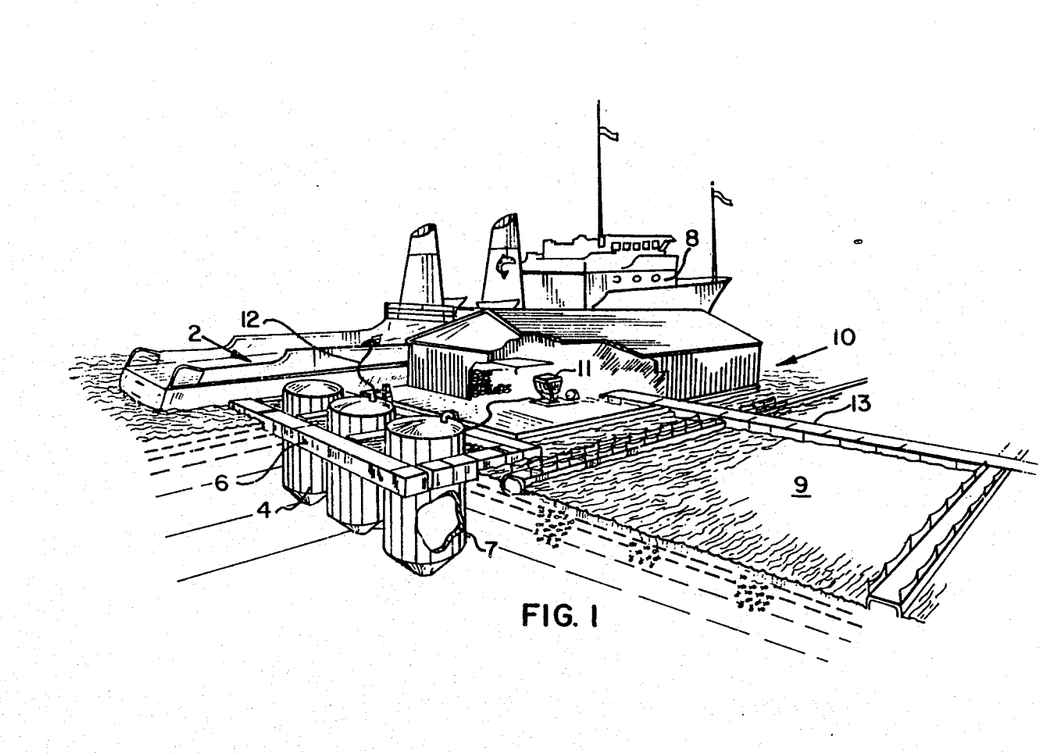
FIG. 1 depicts a perspective view of a three module floating storage and containment facility, located adjacent a fish farm facility.

Referring now to the drawings which illustrate specific embodiments of the invention, but which should not be construed as confining the scope of the overall invention in any way, FIG. 1 illustrates a perspective view of a floating storage and containment facility 2 floating in salt water in association with a typical fish farm facility 10. The floating storage and containment facility 2 is constructed of three containment sleeves 4, which are aligned with one another in a row and held in place by respective flotation collars 6. Liquid fish feed component 7 is shown by cut-away view in the interior of one of the containment sleeves 4. While three containment sleeves 4 are shown arranged in a row in FIG. 1, it will be recognized that because of the modular style construction inherent in the invention, one or more containment sleeves 4 in flotation collars 6 can be arranged in any required pattern to provide whatever type and capacity of storage that is required to supply or suit a particular situation. FIG. 1 illustrates a supply ship 8, which is pumping liquid fish feed component for the fish farm 10 via a supply line 12 which as seen in FIG. 1 is connected to the central containment sleeve 4. A storage product pump line 14 is shown connected to the rightmost containment sleeve 4 (as seen in FIG. 1) and serves to pump liquid or fluidized fish food component to a pump and hopper 11, where water or other materials can be mixed or blended with the liquid fish feed component prior to pumping the mixture or blend to the fish retaining pens 9 through feed lines 13.

Figure 2:
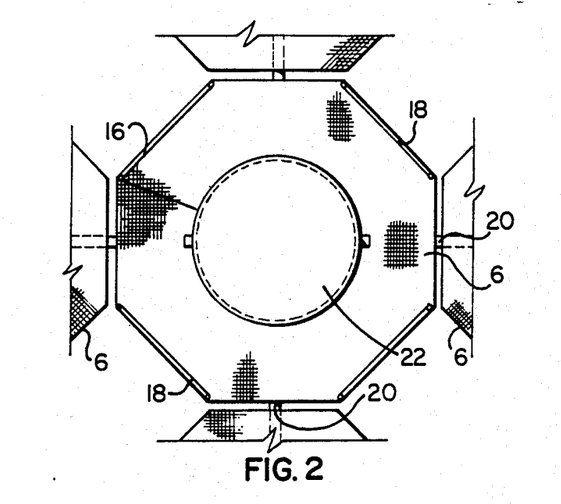
FIG. 2 illustrates a plan view of a floating storage and containment module.

The specific construction of one embodiment of the containment sleeve and flotation collar module is illustrated in FIGS. 2 through 11. FIG. 2 illustrates a plan view of a containment sleeve-flotation collar module. The flotation collar 6 illustrated in FIG. 2 is of hexagonal construction. This construction, as will be recognized, is of a shape different from that disclosed in FIG. 1, wherein the flotation collar was essentially rectangular. It will be understood that this invention pertains to virtually any useful shape of flotation collar including circular triangular, rectangular, square, pentagonal, hexagonal, and as shown in FIG. 2, octagonal. The flotation collar 6, depicted in FIG. 2, has a skid-resistant surface 16 embossed on or formed in the top surface of the flotation collar 6. Further, hand rails 18 are shown at the open sides, where the flotation collar 6 of one module is not adjacent the flotation collar 6 of another module. The hand rails 18 prevent personnel slipping and falling into open seawater, which is usually very cold. As seen in FIG. 2, adjacent flotation collar modules 6 are connected together by flotation collar couplings 20. The couplings 20 can be designed so that they provide rigid, semi-rigid or flexible connections between adjacent flotation collar modules, to suit still water conditions, for example, or to permit flexible movement between the adjacent modules, as might be required to withstand rough water conditions. In other words, adjacent collar modules 6 can be connected together to form a rigid facility if a fixed coupling 20 is used at each of the connecting points, or flexibility can be constructed into the overall system by using flexible couplings 20 (steel cables, gimbles, or the like) thereby permitting, for instance, wave action to be absorbed by individual movement of each of the flotation collars 6.

FIG. 2 also illustrates a cover 22 which fits over the open top of the containment sleeve 4 (which is not visible in FIG. 2). As will be recognized, with the possibility of variable shapes of flotation collars 6, and fixed or assorted flexible flotation collar couplings 20, virtually any shape, combination and fixed or relative movement within the facility can be constructed to satisfy specific applications.

Figure 3:
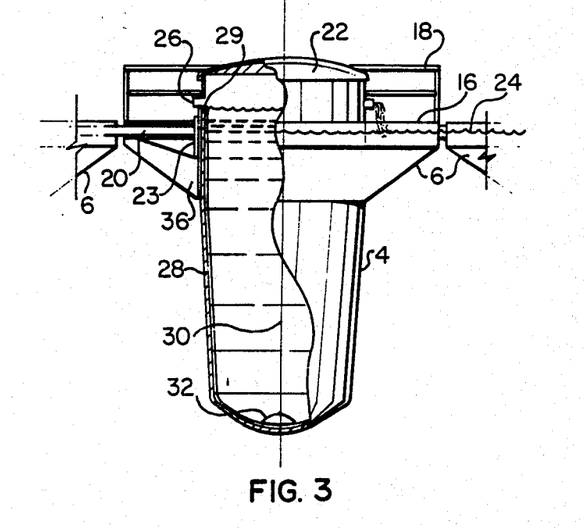
FIG. 3 illustrates a side elevation view of a floating storage and containment module.

FIG. 3 illustrates in side elevation partial section view the construction of the containment sleeve 4 and flotation collar 6. The containment sleeve 4 is of a generally cylindrical construction with the downwardly tapered lower portion. The containment sleeve 4 has therein a water impervious storage diaphragm 28, which is in the form of a long, tapered cylindrical envelope, which conforms closely with the shape of the external containment sleeve 4. In the centre axis of the diaphragm 28, there is positioned a hoist rope 30. At the bottom of the rope 30, there is affixed a diaphragm weight 32. It will be understood that other suitable means of hoisting the weight can be used. The storage diaphragm 28 can be constructed of some suitable flexible waterproof material such as flexible polymerized vinyl chloride. The diaphragm 28 is affixed to the internal circumference of the containment sleeve 4 at an upper point 29, which is immediately below maximum liquid level control scuppers 26. Scuppers 26 permit overflow to take place so that the storage facility cannot be overfilled with storage product, thus exceeding flotation design.

The top of the containment sleeve 4 is covered by cover 22, thereby preventing weather elements from reaching the interior of the diaphragm 28 and its contents. As shown in FIG. 3, sea water level is indicated by 24, and thus, as indicated in FIG. 3, antiskid surface 16 floats above the water level 24. Coupling 20 is also illustrated in FIG. 3 and connects adjacent modules 6. At the left side of FIG. 3, as illustrated in section view, the flotation collar 6 has internal reinforcing structure 23. The flotation collar 6 can be constructed of any suitable combination of materials which provide sufficient buoyancy to enable the containment sleeve 4 to ride in the water at a sufficient level that some of the sleeve 4 remains above water. Typically, the flotation collar 6 can be constructed of aluminum, fibreglass or concrete, with reinforcing steel bars, and expanded polystyrene foam, or any other suitable material(s) to provide a combination which provides resistance to seawater corrosion, rigidity and long life, and engineered flotation ability. Hand rails 18 are also illustrated in FIG. 3. FIG. 3 also shows the weight 32, which holds the bottom of the diaphragm in place, attached to a hoist rope 30, and reinforcing structure 36.

Figures 4, 5, 6, 7:
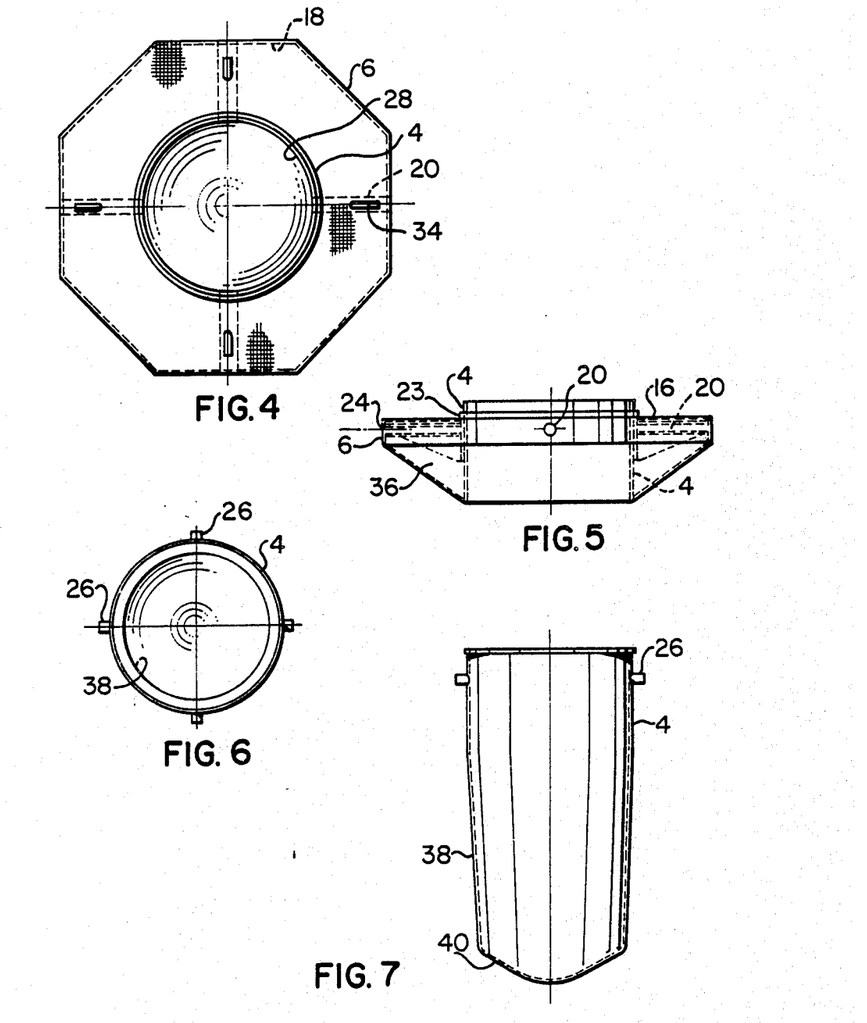
FIG. 4 illustrates a plan view of a flotation collar module encircling a storage and containment module.
FIG. 5 illustrates a side elevation view of a flotation collar module encircling a storage and containment module.
FIG. 6 illustrates a plan view of a containment sleeve.
FIG. 7 illustrates a side elevation view of a containment sleeve.

FIGS. 4 and 5 illustrate respectively plan and side elevation views of the flotation collar 6 construction. As shown, containment sleeve 4 and internal storage diaphragm 28 are positioned within the circular interior opening of the octagonal collar 6. Flotation collar coupling 20 connections, and coupling holders 34 are illustrated in FIG. 4. It will be understood that the construction of the coupling 20 and the holder 34 need not necessarily be as illustrated in FIGS. 4 and 5. Any suitable design of coupling can be utilized, either fixed or flexible. The water level 24 is illustrated in FIG. 5, indicating that the greater part of the collar 6 rides under water. Reinforcing structure 36 such as gusset plates, or the like, is illustrated in side elevation view in FIG. 5. FIG. 5 shows the containment sleeve 4 projecting slightly above the top surface 16 of the collar 6. The diaphragm 28, if desired, can be connected below water level 24. In practice, the containment sleeve 4 will extend substantially above the height of the surface 16 and the diaphragm 28 (not shown) will be suspended within the interior of the containment sleeve 4 by means of diaphragm-sleeve connection point 29, as illustrated previously in FIG. 3.

FIGS. 6 and 7 respectively illustrate plan and side elevation views of the containment sleeve 4. As seen in FIG. 6, the containment sleeve 4 is constructed of a circular shape, with relief scuppers 26 positioned at 90° intervals around the circumference of sleeve 4. As seen in FIG. 7, the lower portion of containment sleeve 4 has a taper 38. Also, in order to enable free circulation of water from the exterior to the interior of the sleeve 4, and vice versa, one or more containment sleeve ports 40, as required, can be constructed in the lower portion of the containment sleeve 4. If desired, the ports 40, or some other suitable pressure compensating means, can be positioned in any other practical location.

Figure 8:
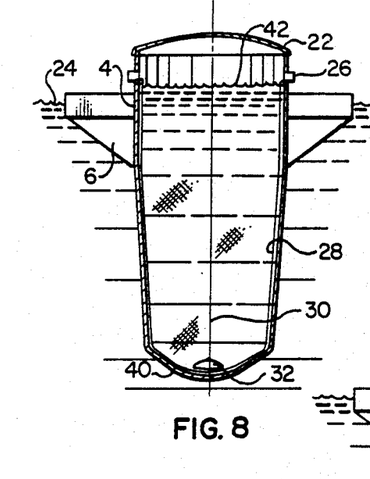
FIG. 8 illustrates a side partial section view of a floating storage and containment module, fully filled with storage product.
Figure 9:
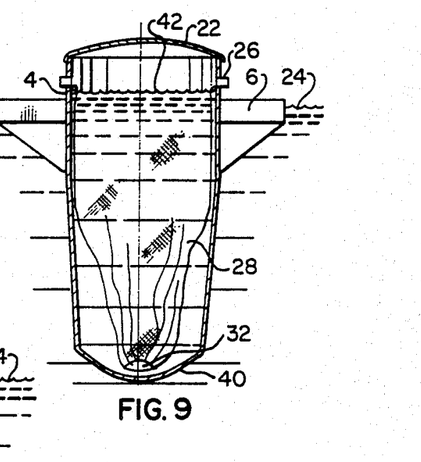
FIG. 9 illustrates a side partial section view of a floating storage and containment module, partially emptied of storage product.
Figure 10:
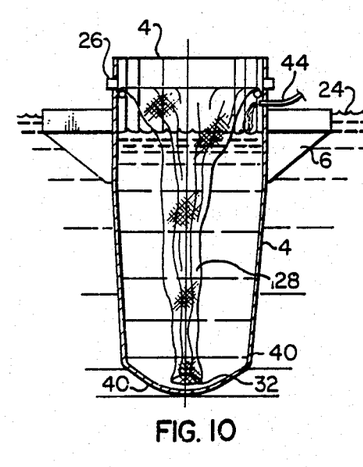
FIG. 10 illustrates a side partial section view of a floating storage and containment module, almost completely emptied of storage product.

FIGS. 8, 9 and 10 illustrate in sequence the action and configuration of the diaphragm 28 as the contents held in the interior of the diaphragm are evacuated. FIG. 8 illustrates the diaphragm 28 fully extended so that it holds a complete load within its confines. When a full load is being held, diaphragm 28 rests against containment sleeve 4 and the weight 32 is at the bottom of the containment sleeve. In FIG. 9, the diaphragm 28 is illustrated as being approximately three-quarters full.

Sea water or outside water moves into the lower region of the containment sleeve 4 through ports 40 to take up the space evacuated by the collapsing diaphragm 28. Conversely, sea water is expelled through ports 40 when the diaphragm 28 is expanded during filling. The weight 32 remains at the bottom of the containment sleeve 28 at all times during such operation. The position of the weight 32 and the ports 40 ensure that the diaphragm 28 collapses upwardly from the bottom, when the diaphragm 28 is emptied of contents, and expands downwardly from the top, when the diaphragm 28 is filled with storage product.

FIG. 10 illustrates the diaphragm 28 almost completely emptied of its contents. The weight 32 remains at the bottom of the containment sleeve 4. However, hoist rope 30 can be raised to lift the diaphragm weight 32, and the diaphragm 28 off the bottom of the containment sleeve 4 as required, for example, for inspection purposes. FIG. 10 illustrates an air pipe 44, which can be used for the purpose of pumping air between the containment sleeve 4 and the diaphragm 28. As seen in FIG. 10, water from outside the containment sleeve 4 has flowed into the interior of the containment sleeve to take up the volume evacuated by the diaphragm 28.

Figures 11, 12:
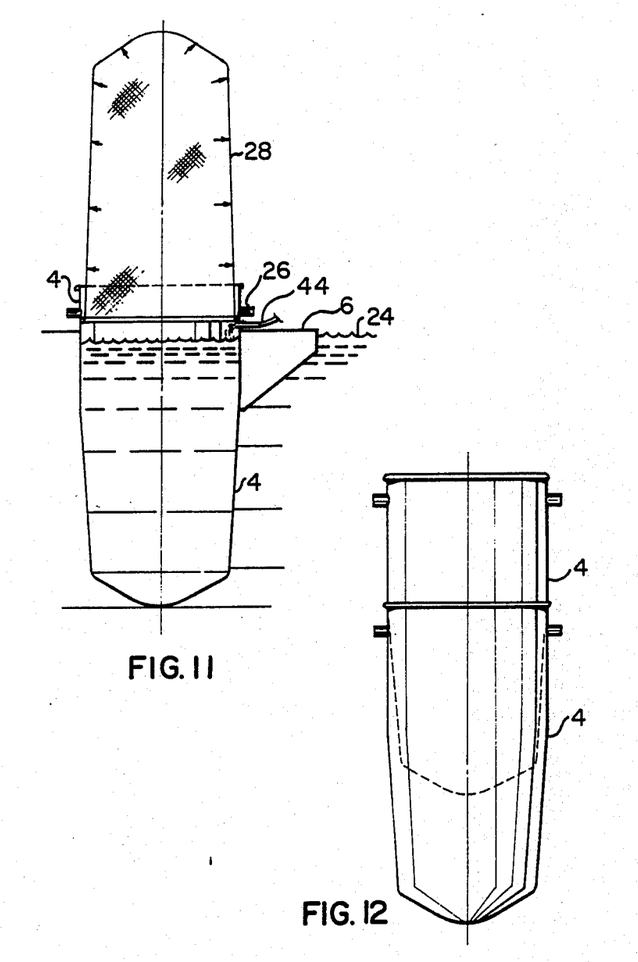
FIG. 11 illustrates a side partial section view of a floating storage and containment module, with the storage diaphragm inflated to an inverted position.
FIG. 12 illustrates a side elevation view of two containment sleeves nested together for shipping.

FIG. 11 illustrates the diaphragm 28 completely inverted by reason of being inflated by air pumped through air pipe 44. In this position, the storage diaphragm 28 can be inspected for leaks, general wear and tear, and can be cleaned in order to remove contaminants and impurities which might adversely affect the quality of the product being stored in the containment sleeve 4 and diaphragm 28 combination. This feature is very important in order to enable the storage facility to readily meet governmental inspection and cleanliness requirements.

FIG. 12 illustrates in side elevation view the manner in which two containment sleeves 4 can be nested together for purposes of shipping from one location to another or storage. This nesting capabiltty greatly reduces the volume taken up by nested containment sleeves and hence reduces shipping costs or storage space.

Figure 13:
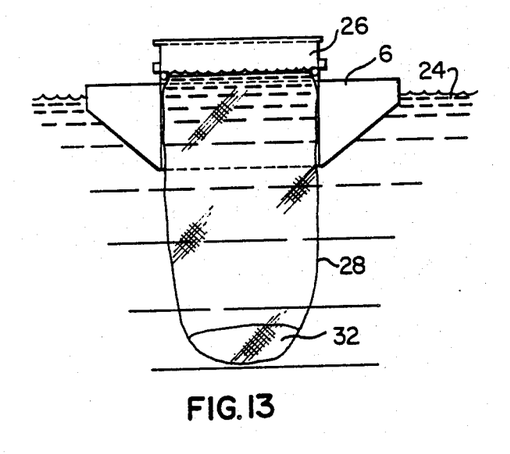
FIG. 13 illustrates a side elevation view of a storage diaphragm secured to a flotation collar module, with no containment means, fully filled with storage product.
Figure 14:
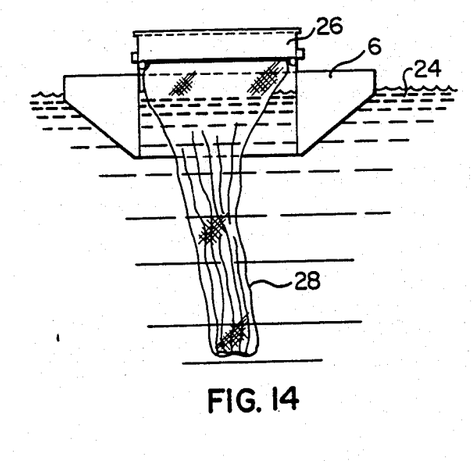
FIG. 14 illustrates a side elevation view of a storage diaphragm secured to a flotation collar module, with no containment means, partially filled with storage product.

FIGS. 13 and 14 illustrate side elevation views of an alternative embodiment of the invention wherein no containment sleeve is used and the diaphragm is connected directly to the flotation collar. FIG. 13 illustrates the diaphragm completely full of storage product while FIG. 14 illustrates the diaphragm partially emptied of storage product.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A self-contained mobile water floating storage facility module for fluid-like materials comprising:
   (a) waterproof pressure compensating hollow flexible diaphragm means which is suitable for retaining therein a fluid-like product within the interior of the diaphragm means, said diaphragm means being enclosed except for an opening at the top which is maintained above the surface of the water;
   (b) flotation means associated with the diaphragm means, said flotation means being adapted to enable the majority of the diaphragm means to be immersed in the water while maintaining the opening of the diaphragm means above the surface of the water; and (c) containment means connected with the flotation means and the diaphragm means, said containment means enclosing a substantial portion of the diaphragm means below the surface of the water, and being open at the top to receive therein the top open end of the diaphragm means.

2. A module as defined in claim 1 wherein the containment means has associated therewith a port which permits water to enter the space between the containment means and the diaphragm means.

3. A module as defined in claim 2 wherein the port is located in the lower region of the containment sleeve.

4. A module as defined in claim 1, 2 or 3 wherein the module is rigidly connected to another module.

5. A module as defined in claim 1, 2 or 3 wherein the module is flexibly connected to another module.

6. A module as defined in claim 1, 2 or 3 wherein the flotation means encircles the containment means.

7. A module as defined in claim 1 wherein a cover is placed over the top of the containment and diaphragm means.

8. A module as defined in claim 7 wherein maximum fluid level control means are provided in the top region of the containment means.

9. A module as defined in claim 8 wherein a portion of the diaphragm means is held at the bottom of the containment means by a weight.

10. A module as defined in claim 9 wherein the weight together with the diaphragm means can be raised relative to the containment means by a hoisting means.

11. A module as defined in claim 8 wherein a portion of the diaphragm means is held at the bottom of the containment means by a restraining device.

* * * * *